US010054354B1

(12) United States Patent
Kennedy et al.

(10) Patent No.: US 10,054,354 B1
(45) Date of Patent: Aug. 21, 2018

(54) ROLLING INSULATED COOLER WITH A SEAT AND A HINGED, ROTATABLE WHEEL SET

(71) Applicant: BIG THREE ENTERPRISES, INC., Gainesville, GA (US)

(72) Inventors: James Caruthers Kennedy, Gainesville, GA (US); Paul C. Kock, Parker, CO (US)

(73) Assignee: BIG THREE ENTERPRISES, INC., Gainesville, GA (US)

( * ) Notice: Subject to any disclaimer, the term of this patent is extended or adjusted under 35 U.S.C. 154(b) by 0 days.

(21) Appl. No.: 15/477,378

(22) Filed: Apr. 3, 2017

(51) Int. Cl.
| | | |
|---|---|---|
| *B62B 3/02* | (2006.01) | |
| *F25D 3/06* | (2006.01) | |
| *F25D 23/12* | (2006.01) | |
| *F25D 23/02* | (2006.01) | |
| *B62B 1/20* | (2006.01) | |
| *B62B 1/24* | (2006.01) | |

(52) U.S. Cl.
CPC .............. *F25D 3/06* (2013.01); *B62B 1/208* (2013.01); *B62B 1/24* (2013.01); *F25D 23/026* (2013.01); *F25D 23/12* (2013.01); *F25D 2400/38* (2013.01)

(58) Field of Classification Search
CPC .... B62B 3/02; B62B 1/12; B62B 3/10; B62B 1/16; B62B 5/00; B62B 1/00; B62B 1/04; B62B 1/20; F25D 3/08; A45B 3/00
See application file for complete search history.

(56) References Cited

U.S. PATENT DOCUMENTS

| | | | | |
|---|---|---|---|---|
| 4,846,493 A | * | 7/1989 | Mason ................... | A45C 5/146 190/18 A |
| 5,228,706 A | * | 7/1993 | Boville .................. | A45C 5/146 280/30 |
| 5,249,438 A | * | 10/1993 | Rhaney .................... | A45C 5/14 16/113.1 |
| 5,373,708 A | | 12/1994 | Dumoulin, Jr. | |

(Continued)

OTHER PUBLICATIONS

"Igloo Coolers", Walmart, downloaded from: https://www.walmart.com/search/?cat_id=4125&facet=category%3AWheeled+Coolers&query=igloo+coolers#searchProductResult on Mar. 31, 2017, 1 page.

(Continued)

*Primary Examiner* — John D Walters
*Assistant Examiner* — James J Triggs
(74) *Attorney, Agent, or Firm* — Mitch Harris, Atty at Law, LLC; Andrew M. Harris

(57) ABSTRACT

A portable insulated cooler having a seat and a hinged mount that secures a set of wheels to the cooler provides easy cooled transport of food and beverages, along with a cooling agent such as ice. The hinged mount secures an axle, to which the wheels are mounted, underneath the cooler in a first position for transport, and is releasable so that in a second position, the wheels rest alongside the cooler, permitting the bottom of the cooler to completely rest on the ground. A seat is rotatably affixed to the top of the cooler, providing a long-term and movable sitting location, and may be releasable from the top of the cooler for easy stowage and transport. A bottom portion of a swivel mounting the seat to the cooler may be formed on the top of the cooler as a raised circular projection with an undercut reducing the cooler height.

31 Claims, 21 Drawing Sheets

(56) References Cited

U.S. PATENT DOCUMENTS

| | | | |
|---|---|---|---|
| 5,465,985 A | | 11/1995 | Devan et al. |
| 5,636,852 A | * | 6/1997 | Sistrunk .................... B62B 1/12 |
| | | | 248/156 |
| 6,802,515 B2 | | 10/2004 | Sorenson et al. |
| 9,211,901 B2 | | 12/2015 | Vanderberg et al. |
| 2008/0001373 A1 | | 1/2008 | Vaughn |

OTHER PUBLICATIONS

"Trailmate", Igloo Coolers, downloaded from: https://www.igloocoolers.com/00034157-trailmate-charcoal-acid-green on Mar. 31, 2017, 1 page.

"27 Qt Woodland Camo Cooler With Swivel Seat", Taiga Coolers, downloaded from: http://www.houzz.com/photos/59187771/27-Qt-Woodland-Camo-Cooler-With-Swivel-Seat-beach-style-coolers-and-ice-chests on Mar. 31, 2017, 1 page.

"Bass Pro Shops Folding Molded Boat Seats", Bass Pro Shops, downloaded from: http://www.basspro.com/Bass-Pro-Shops-Folding-Molded-Boat-Seats/product/12090705082016/ on Mar. 31, 2017, 3 pages (pp. 1-3 in pdf).

"Bass Pro Shops Quick-Release Seat Swivel", Bass Pro Shops, downloaded from: http://www.basspro.com/Bass-Pro-Shops-Quick-Release-Seat-Swivel/product/1211020627123/?cmCat=CROSSSELL_PRODUCT_BO_VTT1 on Mar. 31, 2017, 4 pages (pp. 1-4 in pdf).

"Mac Daddy Caddy", Hunter's Edge, downloaded from: https://www.hunters-edge.com/product/mule-realtree-xtra-camo/ on Apr. 3, 2017, 1 page.

"Disclosure of Prior Use", Apr. 3, 2017, 6 pages (pp. 1-6 in pdf).

\* cited by examiner

US 10,054,354 B1

ROLLING INSULATED COOLER WITH A SEAT AND A HINGED, ROTATABLE WHEEL SET

BACKGROUND OF THE INVENTION

1. Field of the Invention

The present invention relates generally to portable coolers for outdoor uses such as tailgating, camping, hunting and fishing, and more particularly, to an insulated cooler and method that include a seat and a hinged, rotatable wheel set.

2. Description of the Related Art

Insulated coolers are in widespread use for keeping food and beverages cold by placing the food and/or beverages inside an inner cavity of the insulated cooler with ice or other cooling agents. Rolling insulated coolers for outdoor uses such a tailgating, camping, hunting and fishing, are readily available. While the top of the cooler may be used for sitting, the top of the cooler is not a comfortable seat for long-term use such as fishing or hunting from a seated position for hours. While seats have been integrated on cooler tops before, they do not provide the ability to rotate, and the seat raises the profile of the cooler making it difficult to move and store.

Further, the typical wheeled cooler has a low ground clearance, as the wheels are generally of small diameter and are located so that they do not raise the cooler off the ground when it is not tilted. In some designs, larger wheels have been used, but those coolers require the use of legs to prevent the cooler from tilting when not being pulled, which prevents the cooler bottom from laying flat on the ground and providing adequate support for seating.

Therefore, it would be desirable to provide a rolling portable insulated cooler with an integrated seat that provides high ground clearance when rolling along with adequate support when used in a fixed seating location. It would further be desirable to provide such a cooler with a compact storage and moving configuration that is not awkward to move, nor difficult to transport and store.

SUMMARY OF THE INVENTION

The objective of providing a rolling portable insulated cooler with an integrated seat that has high ground clearance and is suitable for providing seating in a fixed location is achieved in a portable insulated cooler and methods of operation and fabrication of the portable insulated cooler.

The portable insulated cooler has an insulated cooler shell defining an inner void for placement of a cooling agent and objects to be cooled. The top of the insulated cooler shell provides access to the inner void for inserting and removing the objects and cooling agent. The portable insulated cooler also includes a cooler top for covering the top of the insulated cooler and a seat mounted to the cooler top. The seat has a bottom base portion and a back support portion extending upward from the base portion. The portable insulated cooler also includes a pair of wheels located near a first end of the cooler and underneath the bottom of the cooler. The wheels are coupled to the insulated cooler shell by a hinged mount mounted to the first end of the cooler such that the wheels can be rotated from a first position beneath the cooler for rolling the cooler to a second position extended away from the first end of the cooler. The wheels are extended so that the bottom of the cooler can be placed on a surface without obstruction by the pair of wheels and without removing the wheels and hinged mount from the portable cooler. The objective of providing a compact storage and moving configuration can be accomplished by mounting the seat to the cooler top with a two-part swivel, and the bottom portion of the swivel may be provided by a circular raised projection having an undercut that is molded on the top surface of the cooler top.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention includes portable insulated coolers and methods of their use and fabrication that have high ground clearance when rolled and include a seat suitable for long-term use. The portable insulated cooler has a set of wheels that is hinged and rotatable so that the wheels can be set under the insulated cooler during pulling for transport and then rotated to a position extended outward alongside an end of the cooler, so that the bottom of the cooler can be laid entirely on a flat surface to prevent rolling, sinking or excessive sliding.

Figure 1:
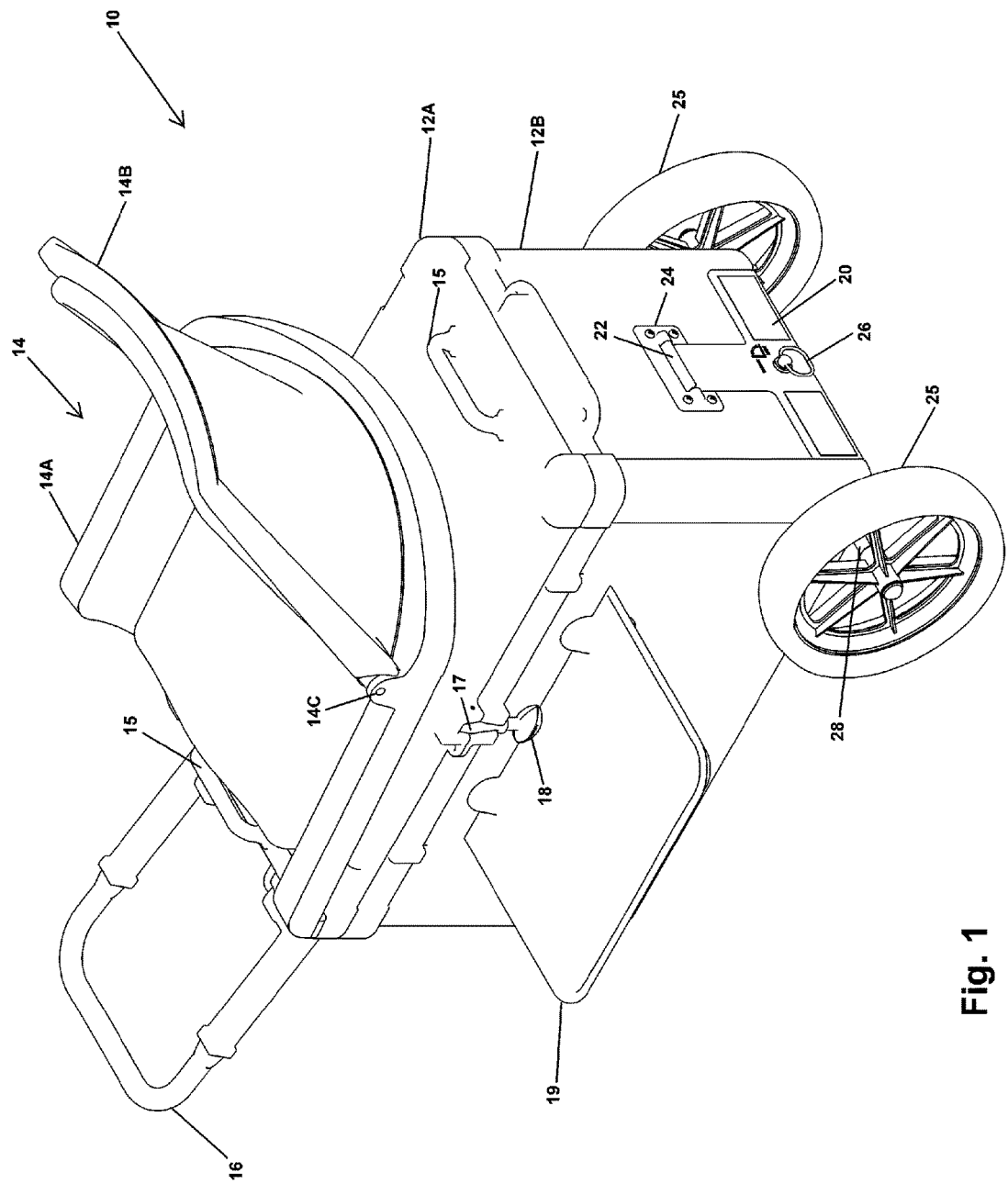
FIG. 1 is a perspective view showing an example of a portable insulated cooler 10 as disclosed herein.

Referring now to FIG. 1, a perspective view of an example portable insulated cooler 10 is shown, in accordance with an embodiment of the disclosure. The main compartment of portable insulated cooler 10 is suitable for use in storing and transporting food and/or beverage items, fishing bait, etc., while keeping items cold using cooling agents such as ice or cooling gel packs. A base 12B of the cooler forms an insulated cooler shell that is molded plastic, but may alternatively be metal or another material such as wood or wood composite, surrounding an insulating foam on both an interior and exterior surface of base 12B, which has a bottom, two sides, two ends and an open top. A top cover 12A of portable insulated cooler 10 is formed to fit base 12B, generally with a ridge and valley connection around the outside rim of base 12B and top cover 12A (not shown).

Portable insulated cooler 10 includes several features that improve the use and convenience of portable insulated cooler 10 for activities such as tailgating (as in tailgate parties at sporting events), fishing, hunting, and camping, as will be described in further detail below. A convenience tray 19 is removable from portable insulated cooler 10 and provides a level surface for gear, food, and other items. A handle 16 is provided for pulling portable insulated cooler 10 by lifting the end of portable insulated cooler 10 at which handle 16 is attached, so that the bottom of portable insulated cooler 10 does not contact the ground and may thus be rolled on a pair of wheels 25 attached to an axle 28 that is located underneath the bottom of portable insulated cooler 10. Axle 28 is secured in position by an L-shaped second portion of a hinged mount 20 that couples axle 28 and thus the pair of wheels 25 to the end of portable insulated cooler 10. Second portion of hinged mount 20 has an extension that extends beneath base 12B by approximately 3" to locate axle 28 2.5" in from the end of base 12B, and supports most of the weight of portable insulated cooler 10 when pulling. Another extension of second hinged portion 20 rises along the end of base 12B approximately 6" when second hinged portion 20 is secured to base 12B. As will be described in detail below, second portion of hinged mount 20 rotates when a latch 26 is turned to release second portion of 20 from the end of portable insulated cooler 10. A hooked end 22 of second portion of hinged mount 20 is secured around a pin (not shown) within portion of hinged mount 24, which also permits removing second portion of hinged mount 20, and thus removal of axle 28 and wheels. Rotating second portion of hinged mount 20 permits wheels 25 and axle 28 to move from underneath base 12B so that the bottom surface of base 12B can lie directly on a surface without rolling due to wheels 25, and prevents excessive sinking or sliding by the entire bottom of portable insulating cooler 10 being unobstructed by wheels 25, axle 28 and the like. The upper end of second portion of hinged mount 20 is detachably engaged in a first portion of hinged mount 24, which is a pin assembly secured to the end of portable insulated cooler 10. Further details of the pin assembly will be described in further detail below, which permits the entire wheel assembly including second portion of hinged mount 20 to be removed for stowing and/or transport.

Portable insulated cooler 10 also includes an integrated seat 14 having a base portion 14A that is rotatably and detachably connected to top cover 12A, so that seat 14 can be swiveled atop portable insulated cooler 10, and optionally entirely removed from portable insulated cooler 10. Removal of seat 14 provides improved handling and reduced profile (height) for transport, as well as easier access to the contents of insulated cooler 10 when seat 14 is not being used. A back portion 14B is also rotatably mounted to base portion 14A with a pair of hinges 14C, so that back portion 14B can be folded down on to base portion 14A, which will also increase convenience of access to the inside of portable insulated cooler 10, as well as reducing the profile of portable insulated cooler 10 for transport. A latch post 17 and a latch handle 18 are used to secure portable insulated cooler 10 on each side, and handle 18 may have custom design shapes tailored to exhibit the owner's particular interests, e.g., a football as illustrated. A pair of handles 15 are formed on the top of top cover 12A for removing top cover 12A from portable insulated cooler 10 when latch posts 17 are not engaged in base 12B, or for lifting portable insulated cooler 10 and contents thereof, if latch posts 17 are engaged in base 12B. Further details and configurations of portable insulated cooler 10 of FIG. 1 are illustrated below in different views according to the individual figures. Like reference designators refer to the same elements and descriptions will not generally be repeated, for brevity.

Figure 2:
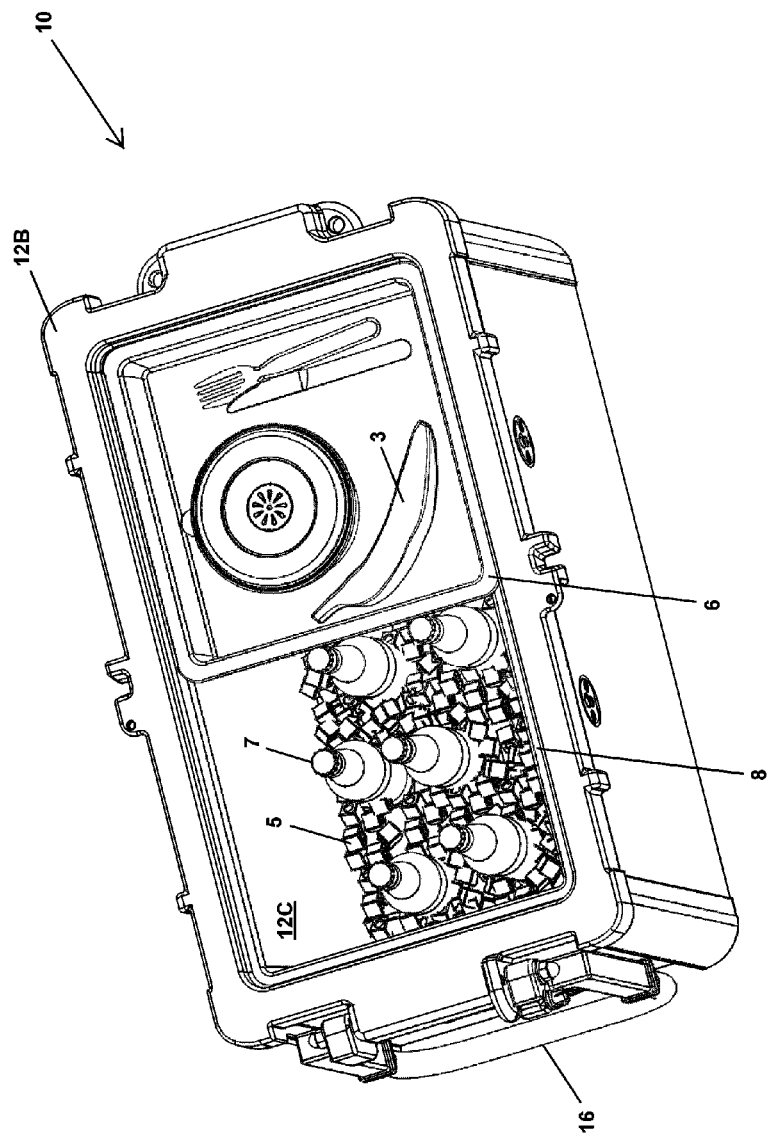
FIG. 2 is a perspective view showing internal features of portable insulated cooler 10.

Referring now to FIG. 2, a perspective view showing internal features of portable insulated cooler 10 is shown with top cover 12A and other accessories and attachments removed. An internal chamber 12C of base 12B is illustrated, and contains food items 3 and beverages 7, along with cooling agents 5, which in the example are ice cubes. A tray 6 is provided and rests on the lower edge of a channel 8 to which top cover 12A provides a mating edge to seal portable insulated cooler 10. Details of handle 16 can be seen in the lowered position.

Figure 3:
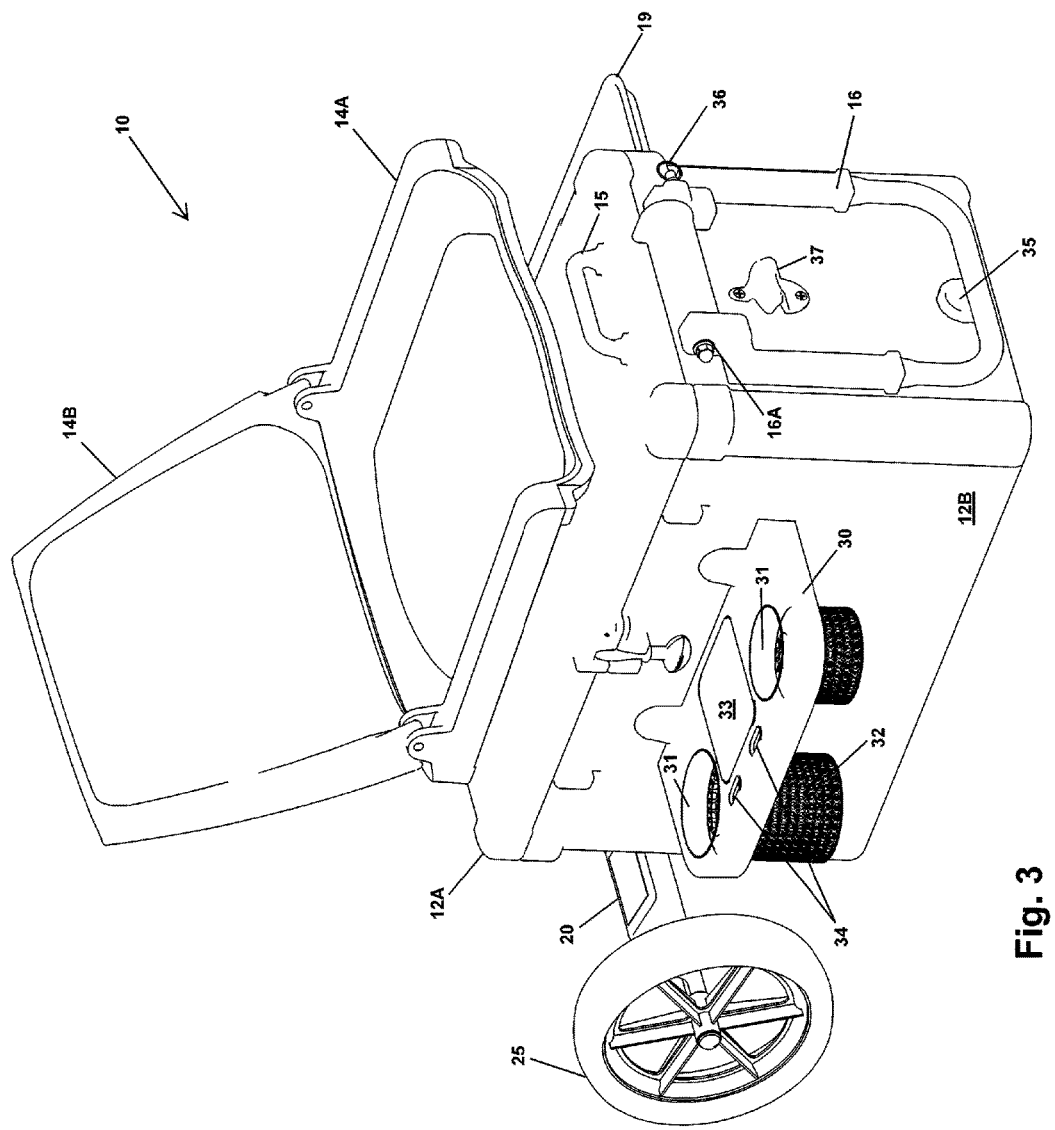
FIG. 3 is a perspective view showing additional features of portable insulated cooler 10.

Referring now to FIG. 3, a perspective view showing additional features of portable insulated cooler 10 is provided from a right side of portable cooler 10 opposite the left side of portable insulated cooler 10 that is shown in FIG. 1. Second portion of hinged mount 20 is in the extended position so that the bottom surface of base 20 rests on the ground. Handle 16 is hinged with a bolt and nut assembly 16A and includes a locking pin/pull-ring assembly 36 that is spring loaded to fit into a hole formed in a shoulder formed in base 12B to lock handle 16 into the raised (pulling) position. A drain plug 35 provides for draining internal chamber 12C of water from melting ice. A cup holder/tray 30 is attached to the left side of base 12B and provides two different cup diameter circular apertures 31 therethrough, with replaceable mesh cylinders 32 mounted thereto for supporting the bottom of cups having diameters smaller than the respective circular apertures 31. The sizing is generally such that the smaller one of circular apertures aperture 31 will hold a typical bottle, can, or standard insulated cup and the larger one of circular apertures will hold a typical large insulated tumbler. A recess 33 is provided sized for holding ammunition or other items, and is generally sized to hold the size of a typical box of 12 ga shotgun shells. Holes 34 are also provided for holding knives, hooks, etc., for fishing. A bottle opener 37 is secured to the front end of base 12B.

Figure 4:
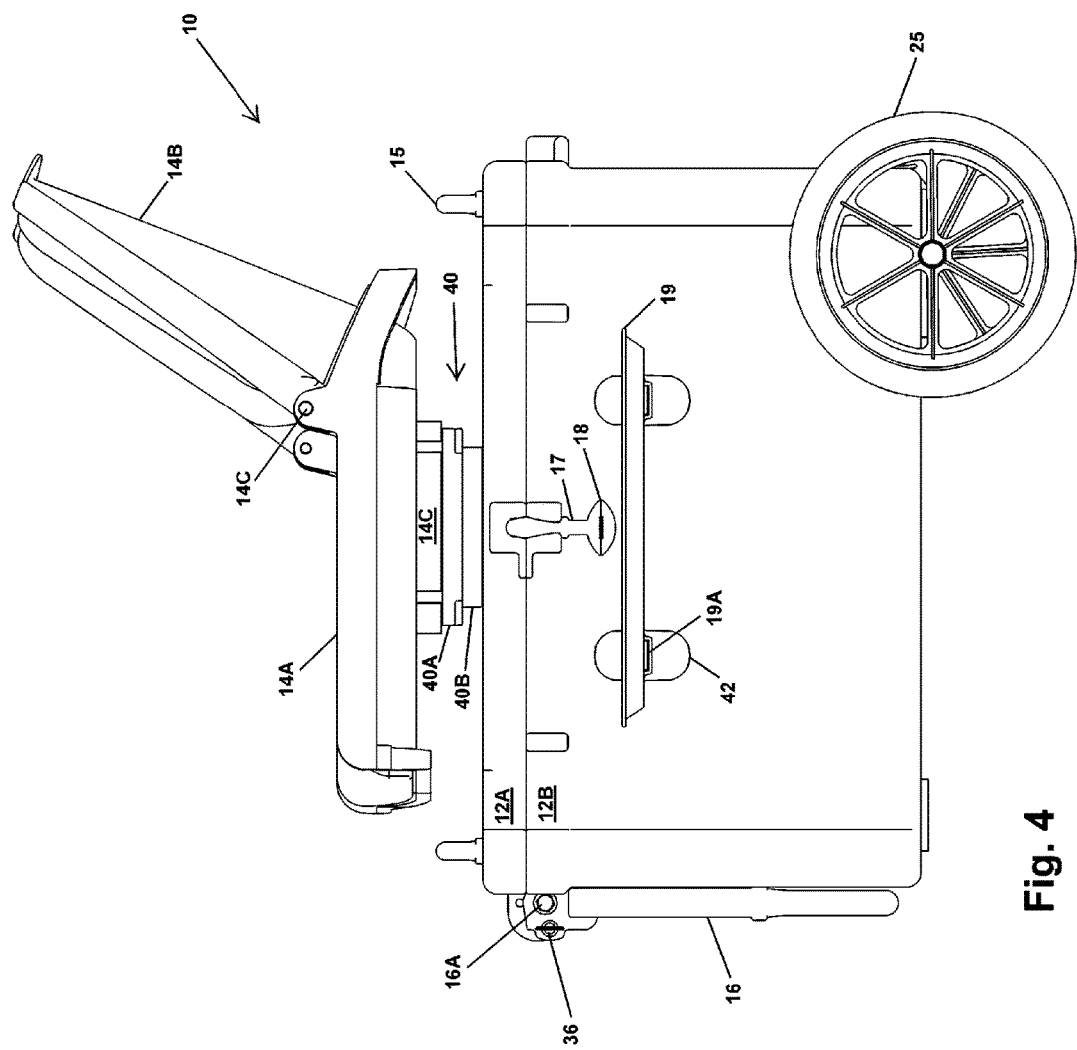
FIG. 4 is a right side view showing features of portable insulated cooler 10.
Figure 5:
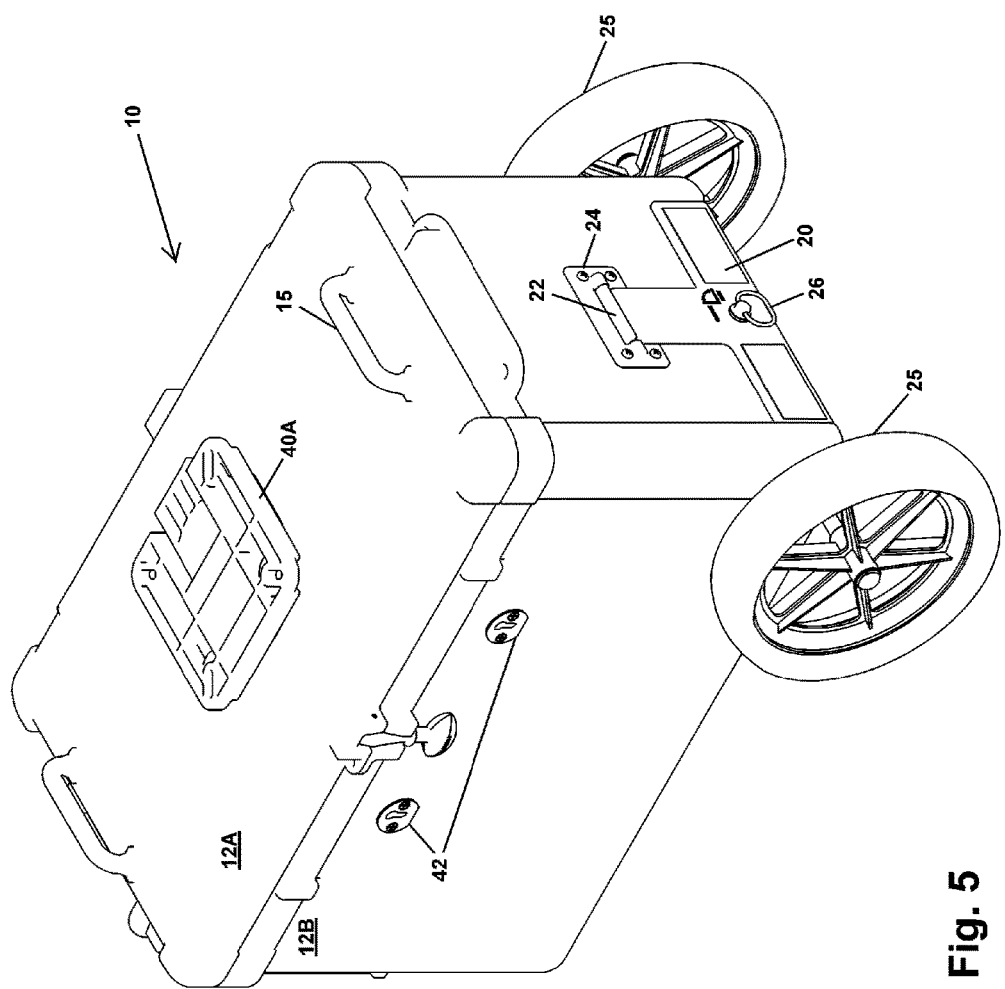
FIG. 5 is a perspective view showing details of a top swivel portion 40A of portable insulated cooler 10.

Referring now to FIG. 4, a right side view showing features of portable insulated cooler 10, including convenience tray 19, latch post 17 and latch handle 18. Support arms 19A for convenience tray 19 are also shown, along with attachment plates 42 that provide attachment of support arms 19A to base 12B. A mounting arrangement including a separable swivel 40 for seat 14 is shown, with a top swivel portion 40A bolted to a mounting plate 14C portion of base portion 14A of seat 14. Seat 14 may be a standard bolt-pattern seat such as those provided for boating use, and mounting plate 14C includes bolt holes according to the standard bolt-pattern to accommodate such seats. A bottom swivel portion 40B is molded as part of top cover 12A in the illustrated example, but may alternatively be a separate bottom swivel portion 40B attached to top cover 12A. Bottom swivel portion 40B has a cylindrical profile with an undercut (not shown) that mates with an edge formed inside top swivel portion 40A, so that seat 14 can be rotated a full 360 degrees of rotation. Top swivel portion 40A also includes a release lever (not shown) that releases top swivel portion 40A from bottom swivel portion 40B, so that seat 14 can be removed from top cover 12A. FIG. 5 shows top swivel portion 40A mounted to top cover 12A including slotted bolt holes at each corner. Attachment plates 42 are shown with convenience tray 19 removed, revealing the keyhole pattern that mates with studs at the back end of support arms 19A, which are inserted and then slid down to lock convenience tray 19 in place.

Figure 6:
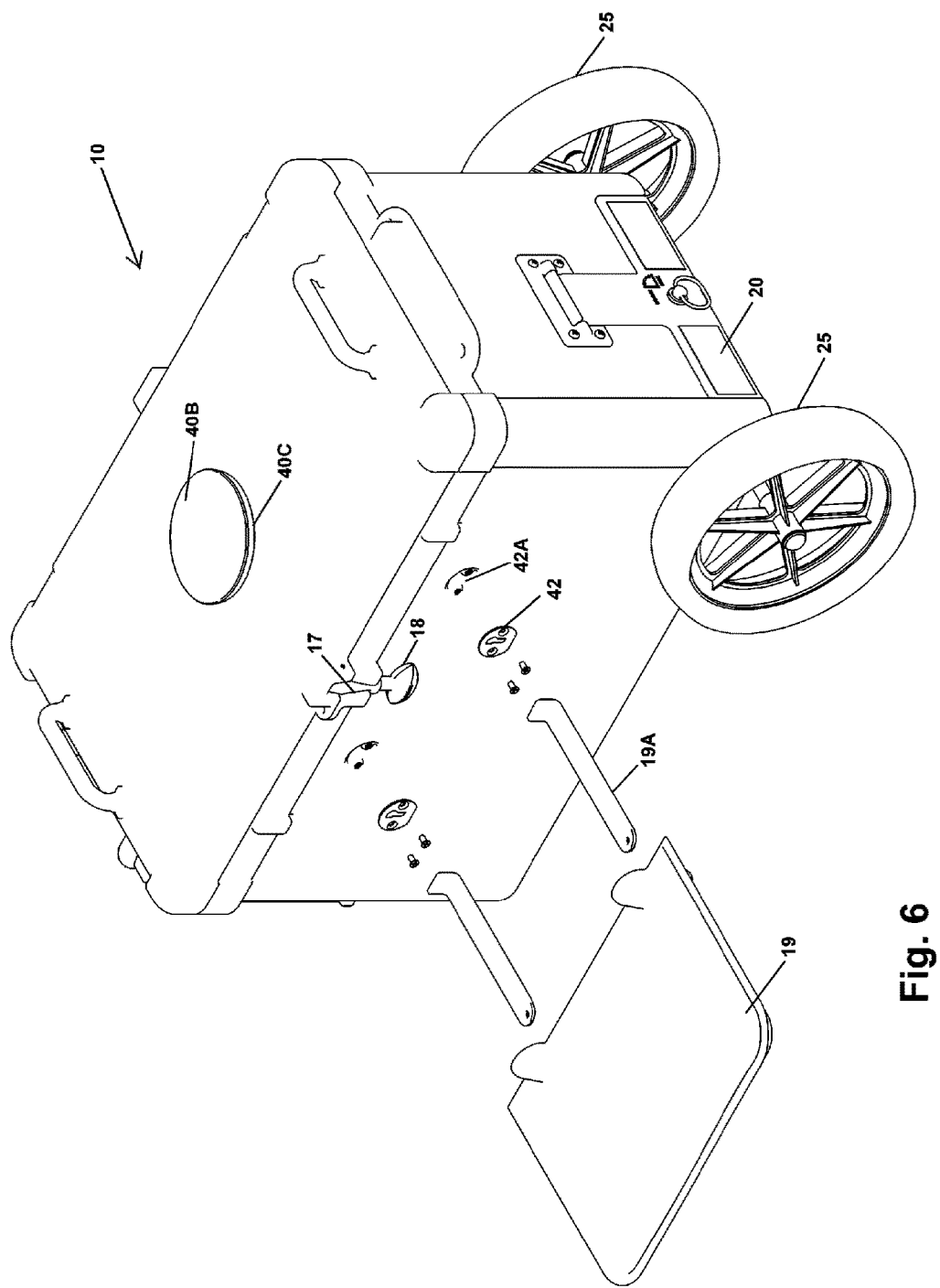
FIG. 6 is an exploded perspective view showing details of a tray 19 of portable insulated cooler 10.
Figure 7:
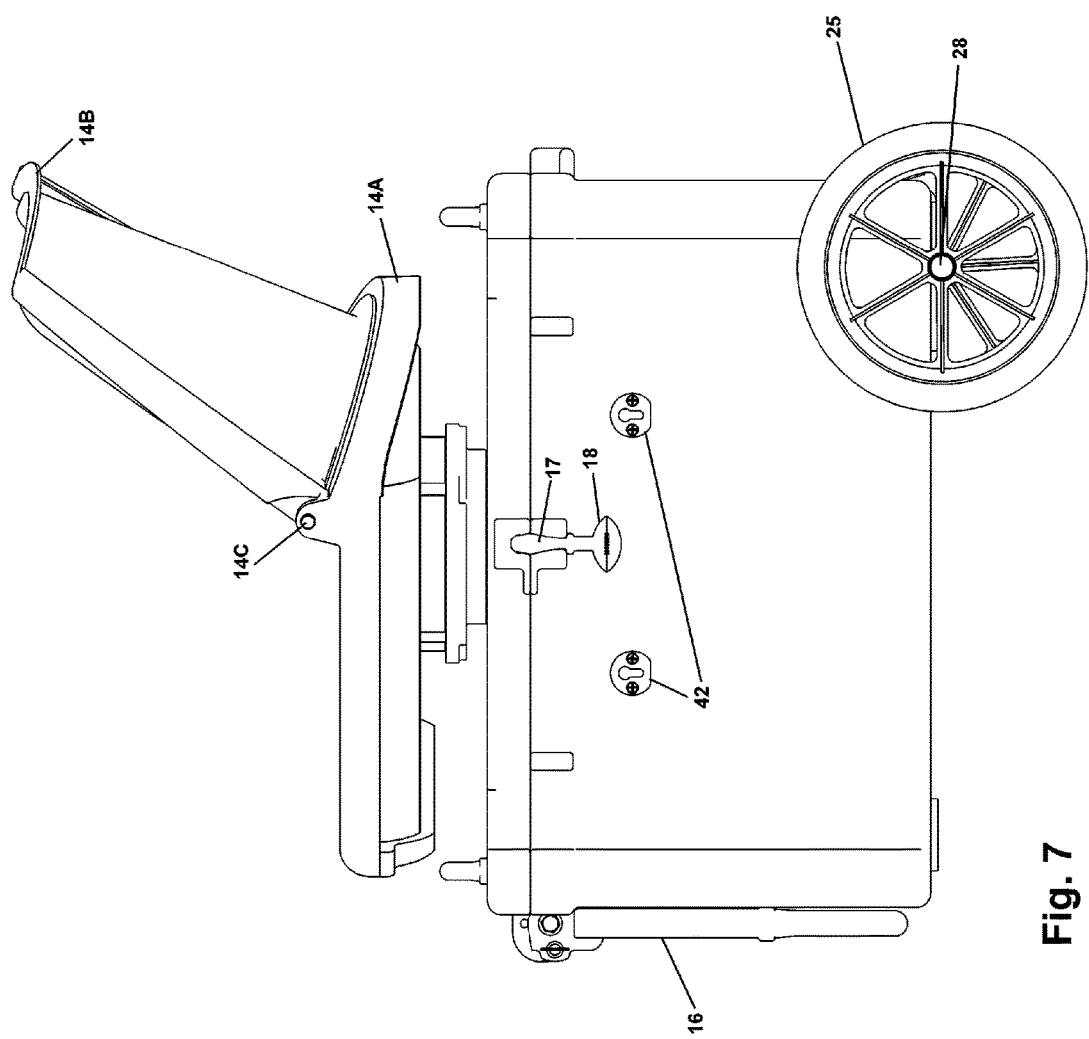
FIG. 7 is a left side view of portable insulated cooler 10.

Referring now to FIG. 6, an exploded perspective view shows details of convenience tray 19 of portable insulated cooler 10. Support arms 19A slide into slots molded into convenience tray 19 and attachment places 42 are bolted to recesses formed in base 12B sized to accommodate attachment plates 42, so that when convenience tray 19 is removed, the surface of base 12B does not have projections that can catch on clothes, vehicle interiors, and the like. FIG. 6 also shows the shape of bottom swivel portion 40B atop top cover 12A and undercut 40C that retains the internal mating ring of upper swivel portion 40B (not shown). FIG. 7 is a left side view of portable insulated cooler 10 showing seat 14 mounted to top cover 12A and the shape of attachment plates 42.

Figure 8:
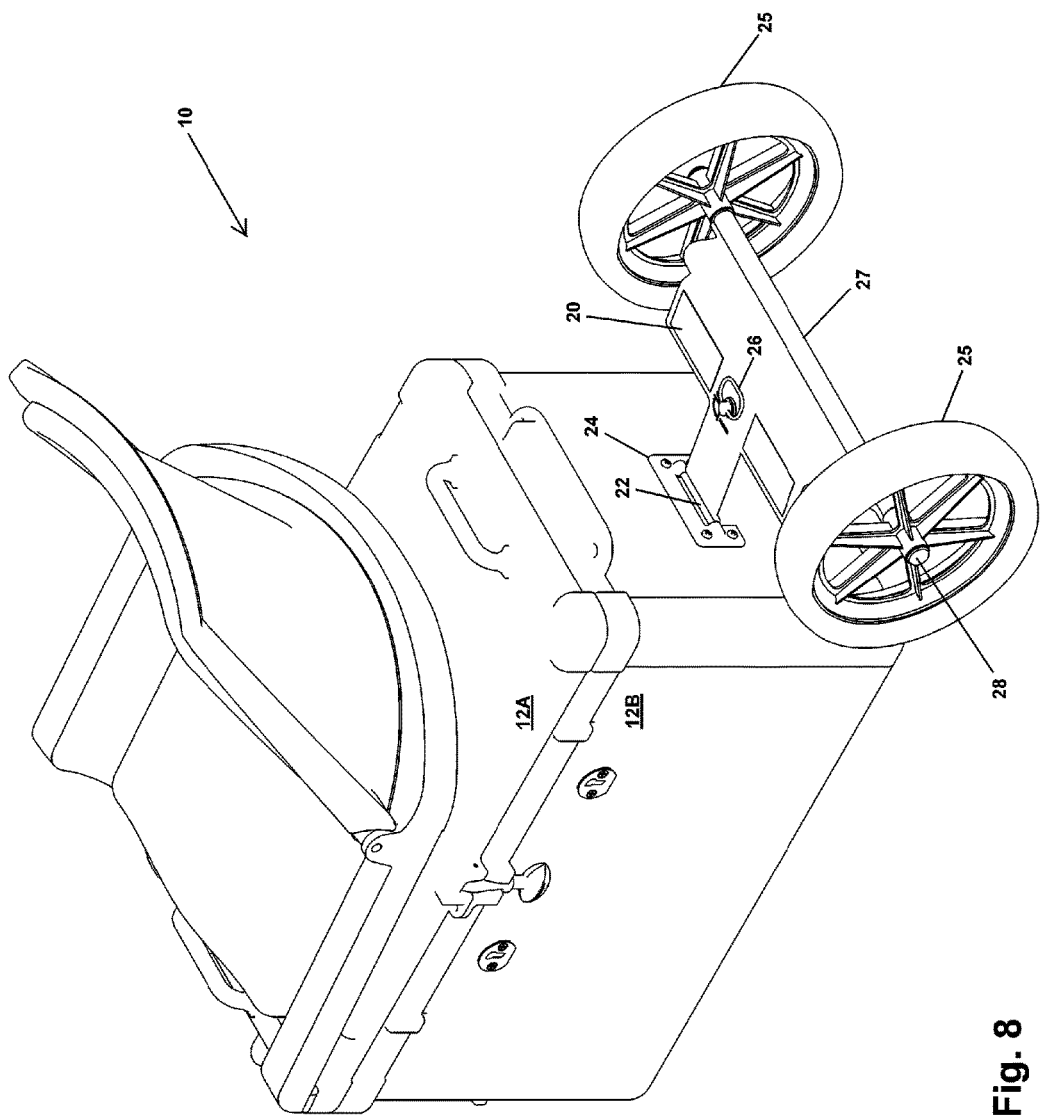
FIG. 8 is a perspective view showing a second portion of a hinged mount 20 of portable insulated cooler 10 in an extended position.

Referring now to FIG. 8, a perspective view showing second portion of hinged mount 20 of portable insulated cooler 10 in an extended position is shown. When latch 26 is rotated to an unlocked position, second portion of hinged mount 20 is released from base 12B and can be rotated so that wheels 25 lie on a surface adjacent to portable insulated cooler 10. Second portion of hinged mount 20 remains securely attached to first portion of hinged mount 24 so that if the portable insulated cooler 10 is moved, second portion of hinged mount 20, along with wheels 25 will not unintentionally detach. FIG. 8 also shows details of a bushing 27 formed at the end of second portion of hinged mount 20 through which axle 28 is inserted to permit rolling of portable insulated cooler 10 on wheels 25.

Figure 9:
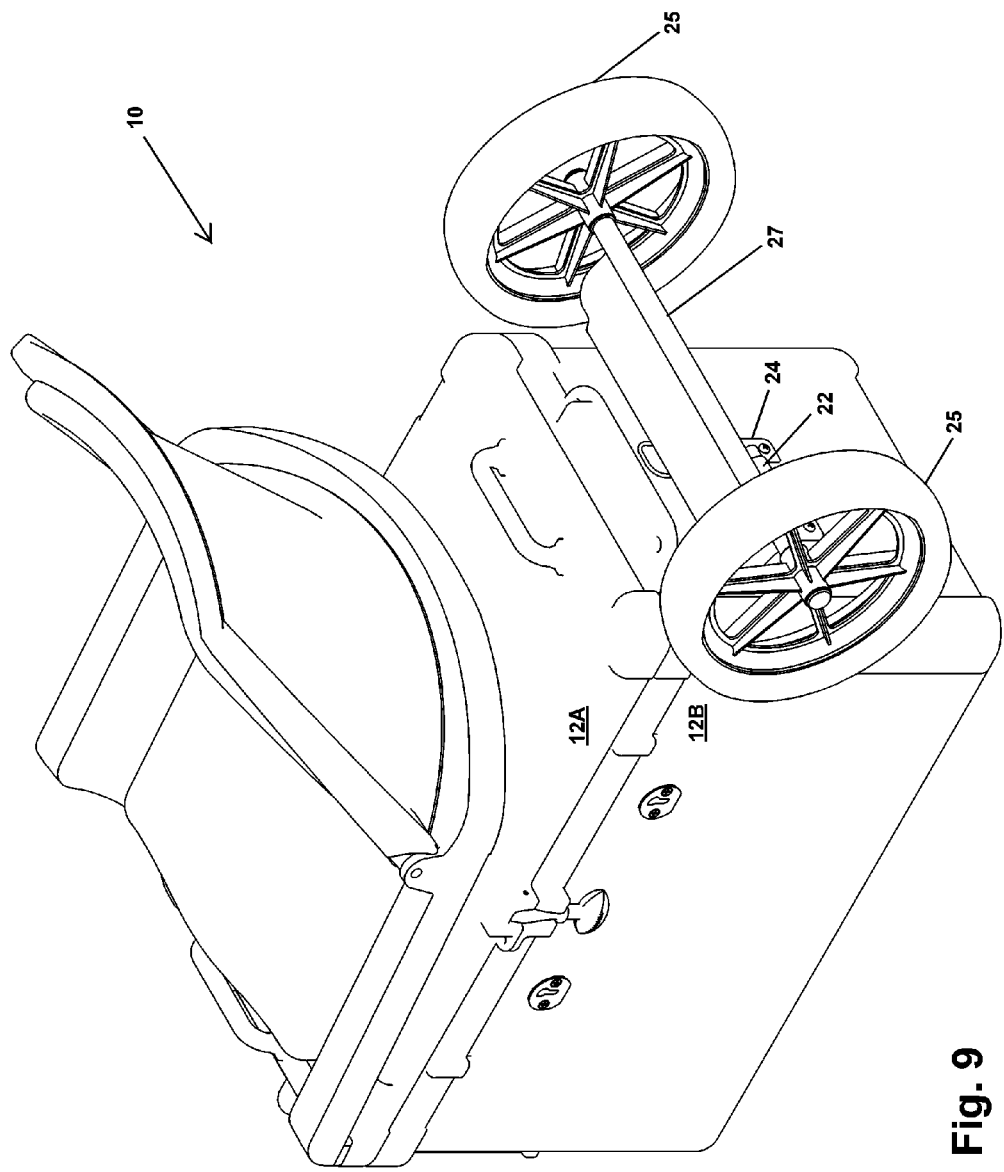
FIG. 9 is a perspective view showing second portion of hinged mount 20 of portable insulated cooler 10 in a raised position.
Figure 10:
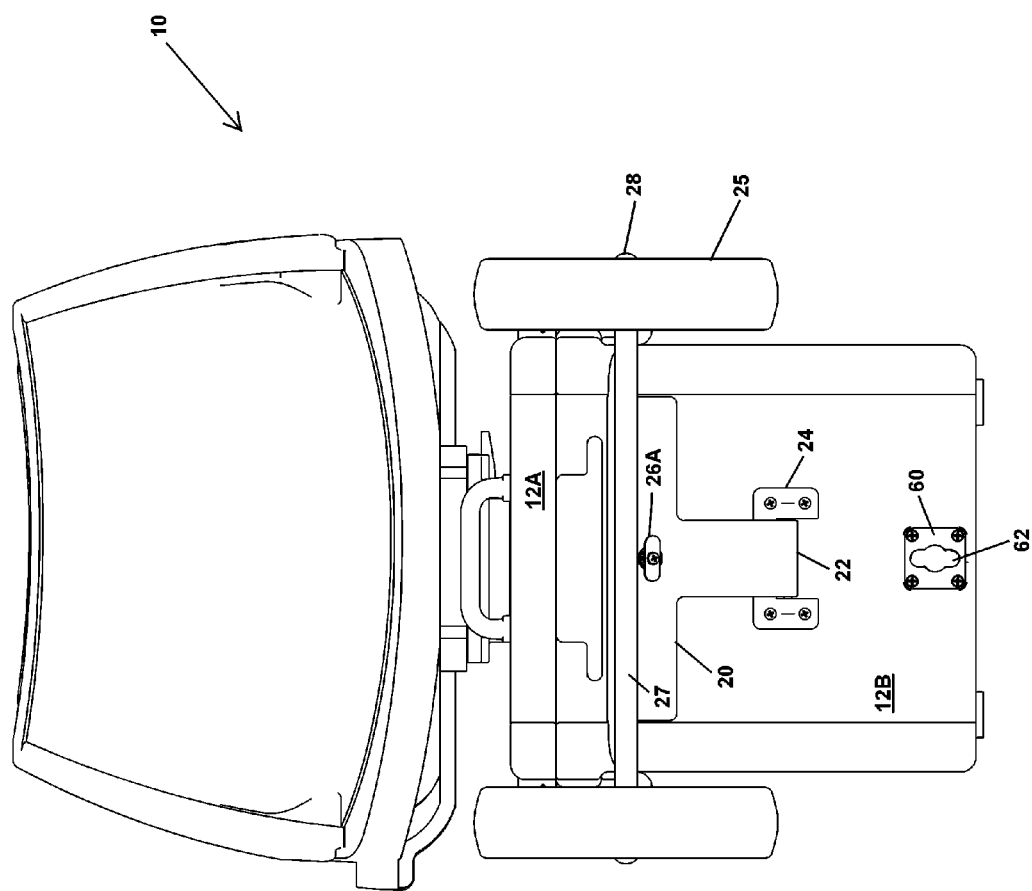
FIG. 10 is a back end view showing second portion of hinged mount 20 of portable insulated cooler 10 in the raised position.

Referring now to FIG. 9, a perspective view showing second portion of hinged mount 20 of portable insulated cooler 10 in a raised position, is shown. The raised position is used to detach second portion of hinged mount 20 and wheels 25 from base 12B. FIG. 10 shows a back end of portable insulated cooler 10 with a detailed view of first portion of hinged mount 24, from which a hooked end 22 of second portion of hinged mount 20 can be slid downward once second portion of hinged mount 20 is in the raised position. FIG. 10 also shows the shape of a lock plate 60 having a shaped aperture 62 through which a tang 26A of latch 26 can be inserted when latch 26 is in the unlocked position, and turned to retain tang 26A behind lock plate 60 when latch 26 is in the locked position, which retains second portion of hinged mount 20 in contact with the end of portable insulated cooler 10.

Figure 11:
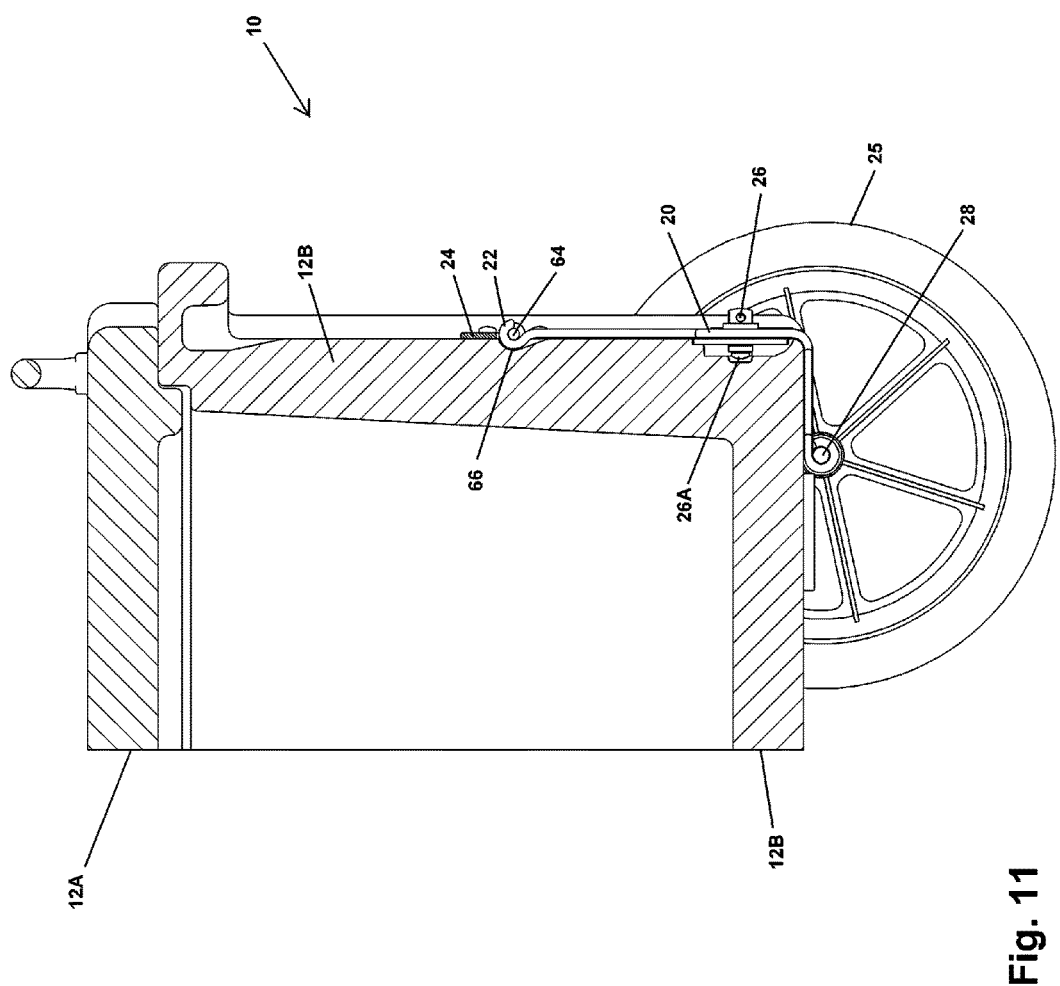
FIG. 11 is a side cross-section view showing details of second portion of hinged mount 20 of portable insulated cooler 10 in the secured position.
Figure 12:
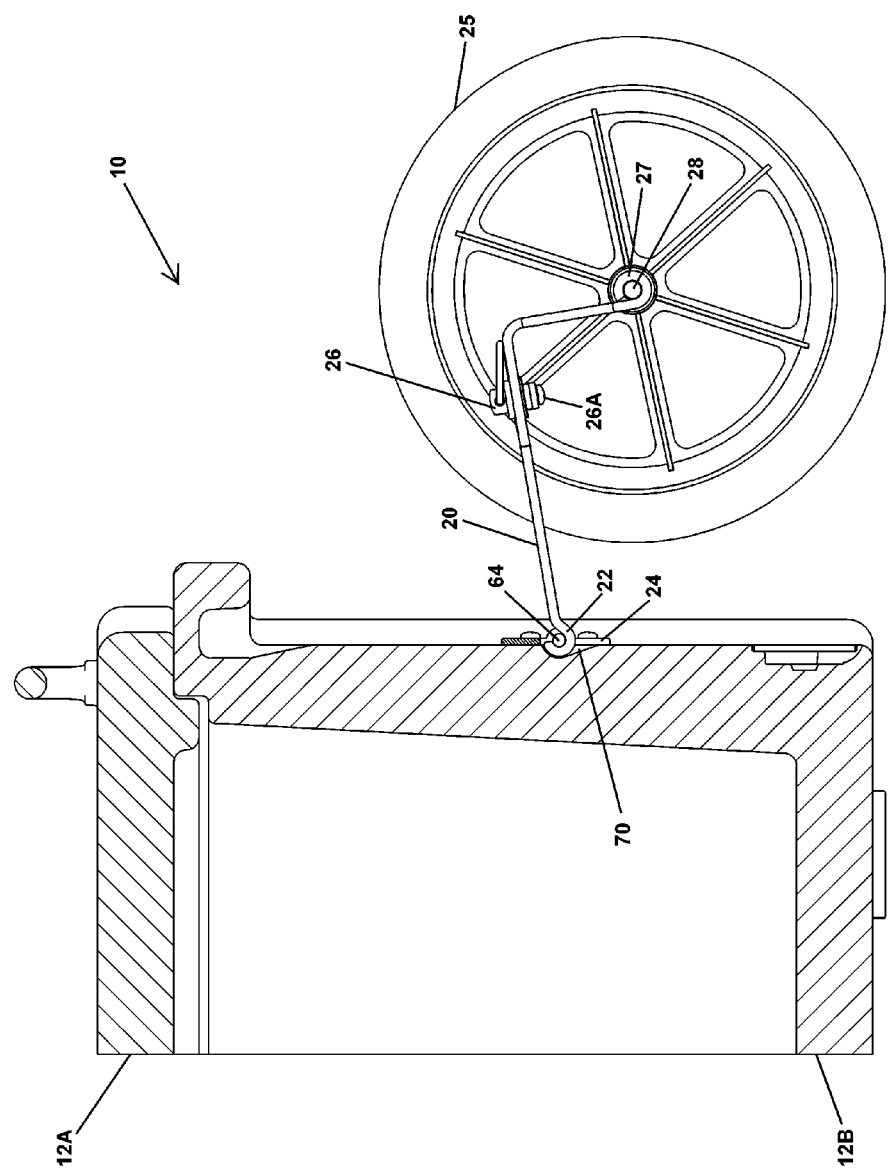
FIG. 12 is a side cross-section view showing details of second portion of hinged mount 20 of portable insulated cooler 10 in the extended position.
Figure 13:
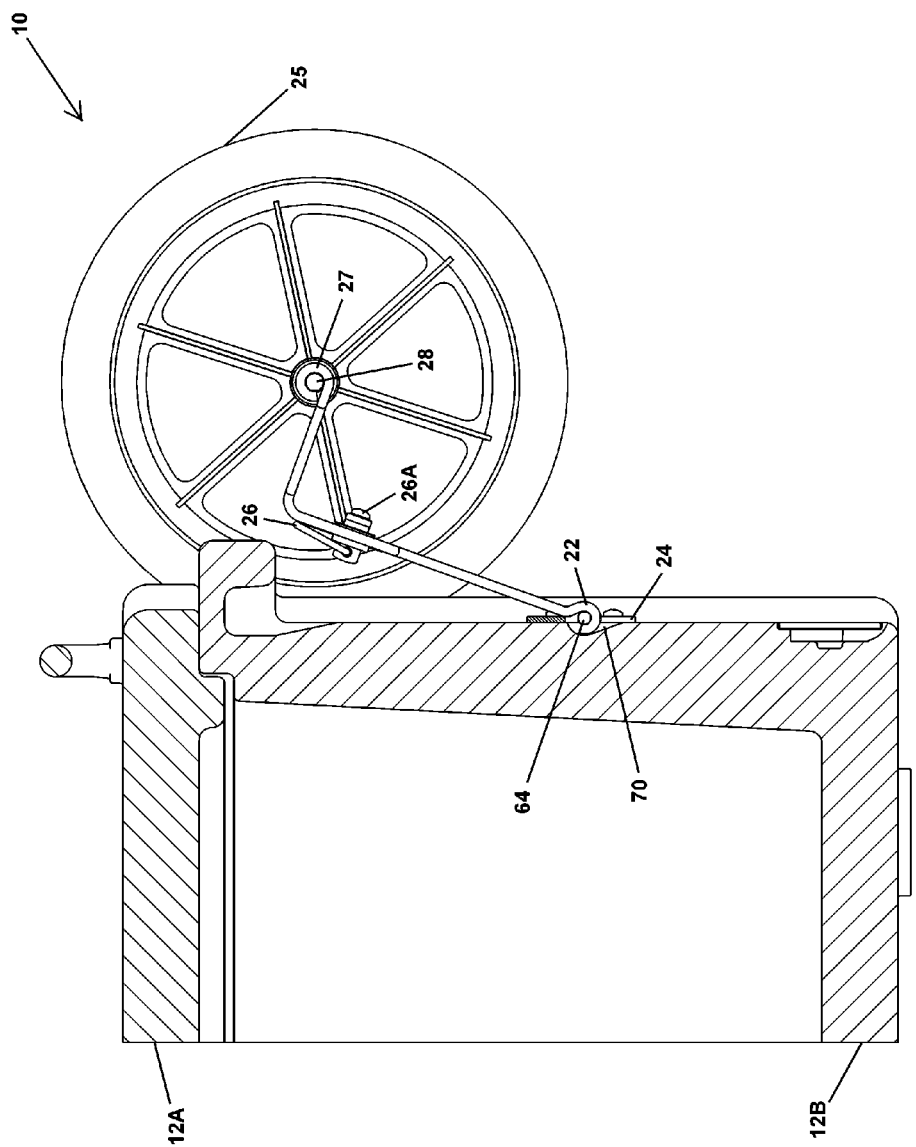
FIG. 13 is a side cross-section view showing details of second portion of hinged mount 20 of portable insulated cooler 10 in the raised position.

FIGS. 11-13 are side cross-section views showing second portion of hinged mount 20 in the secured position, the extended position, and the raised position, respectively. As seen in FIG. 11, when latch 26 is rotated so that tang 26A is parallel to the bottom of base 12B and captured behind lock plate 60, latch 26 secures second portion of hinged mount 20 against the end of base 12B, so that axle 28 is underneath base 12B, which lifts base 12B off of the ground or other supporting surface via wheels 25, so that portable insulated cooler 10 can be rolled. A rounded portion 66 of hooked end 22 is secured within the first portion of hinged mount 24 by a pin 64 and the wall along the end of base 12B. In FIG. 12, latch 26 has been turned to release tang 26A and second portion of hinged mount 20 is released from base 12B so that wheels 25 and axle 28 are no longer underneath base 12B, but alongside the end of base 12B. Rounded portion 66 of hooked end 22 is still retained by pin 64 and a shaped recess 70 of the outer wall formed along the end of base 12B, so that hooked end 22 will not slide downward. In FIG. 13 second portion of hinged mount 20 has been lifted to the raised position, and pin 64 no longer prevents hooked end 22 from sliding downward, permitting the user to remove wheels 25 and second portion of hinged mount 20 as a single unit for stowing and for use of portable insulated cooler 10 without wheels attached.

Figure 14:
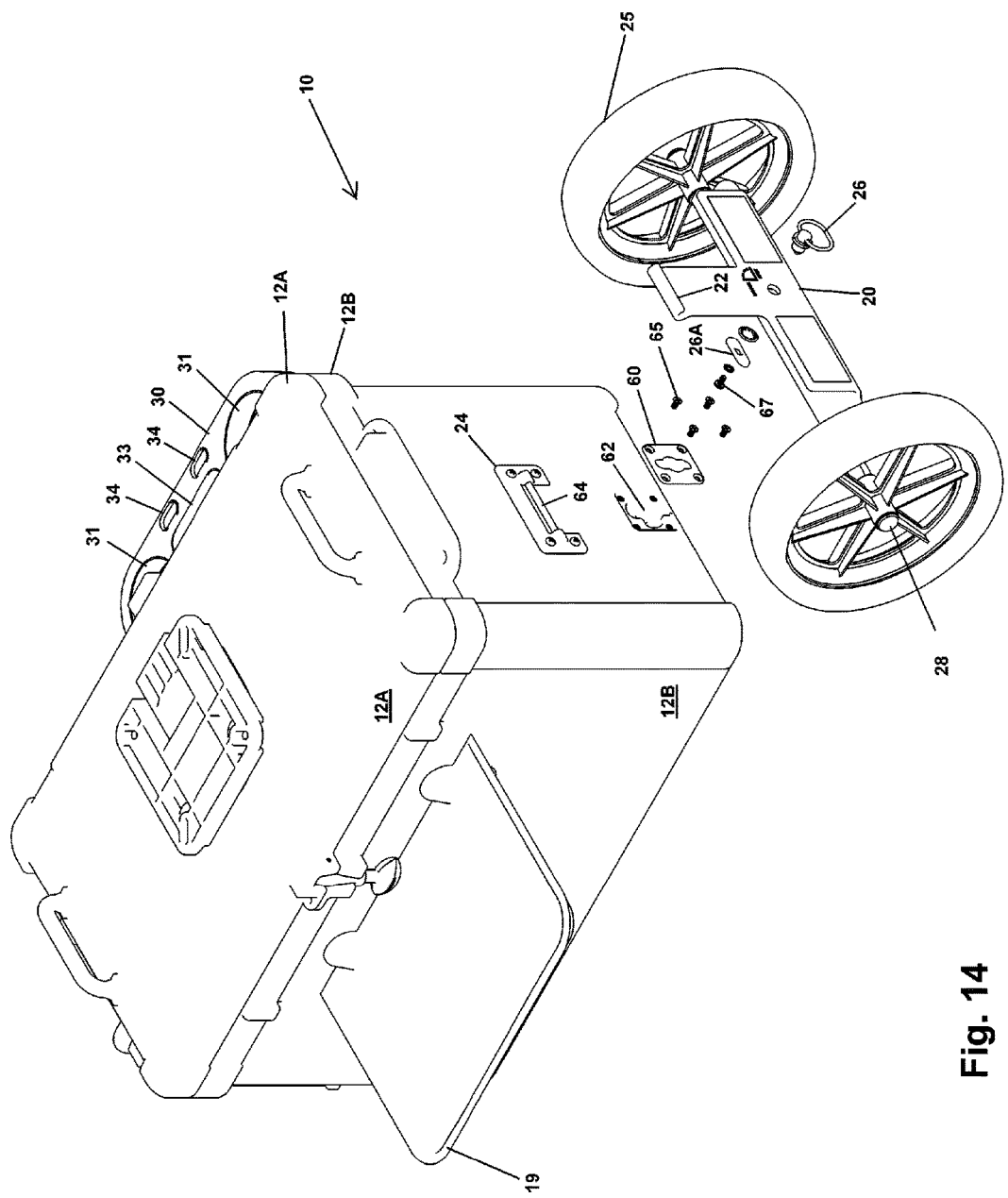
FIG. 14 is a perspective view showing an exploded view of a second portion of a latch 26 and a lock plate 60 of portable insulated cooler 10.
Figure 15:
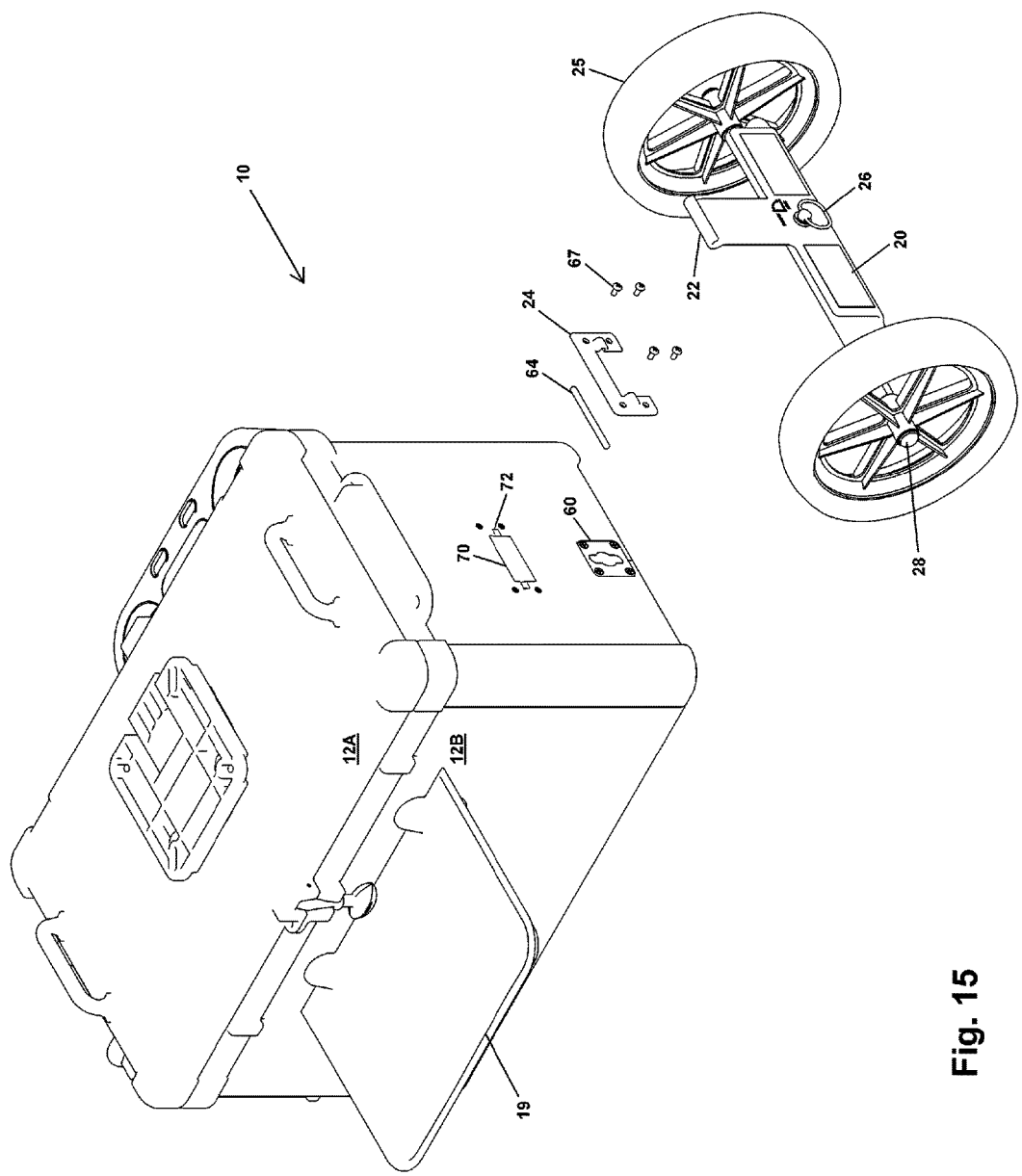
FIG. 15 is a perspective view showing an exploded view of a mounting of a first portion of hinged mount 24 including a pin 64 that is used to attach second portion of hinged mount 20 to portable insulated cooler 10.
Figure 16:
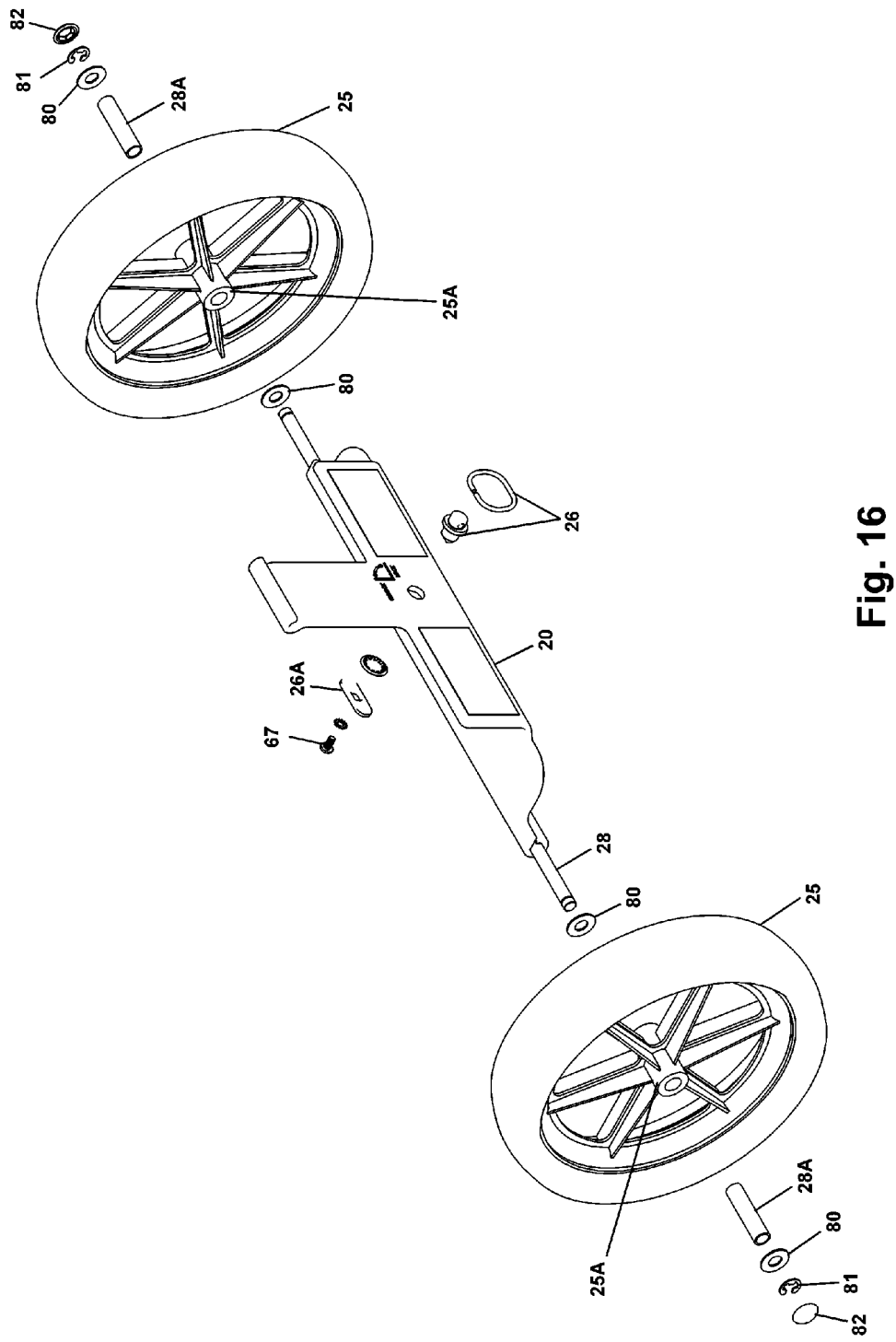
FIG. 16 is a perspective view showing an exploded view of second portion of hinged mount 20 and wheels 25 of portable cooler 10.
Figure 17:
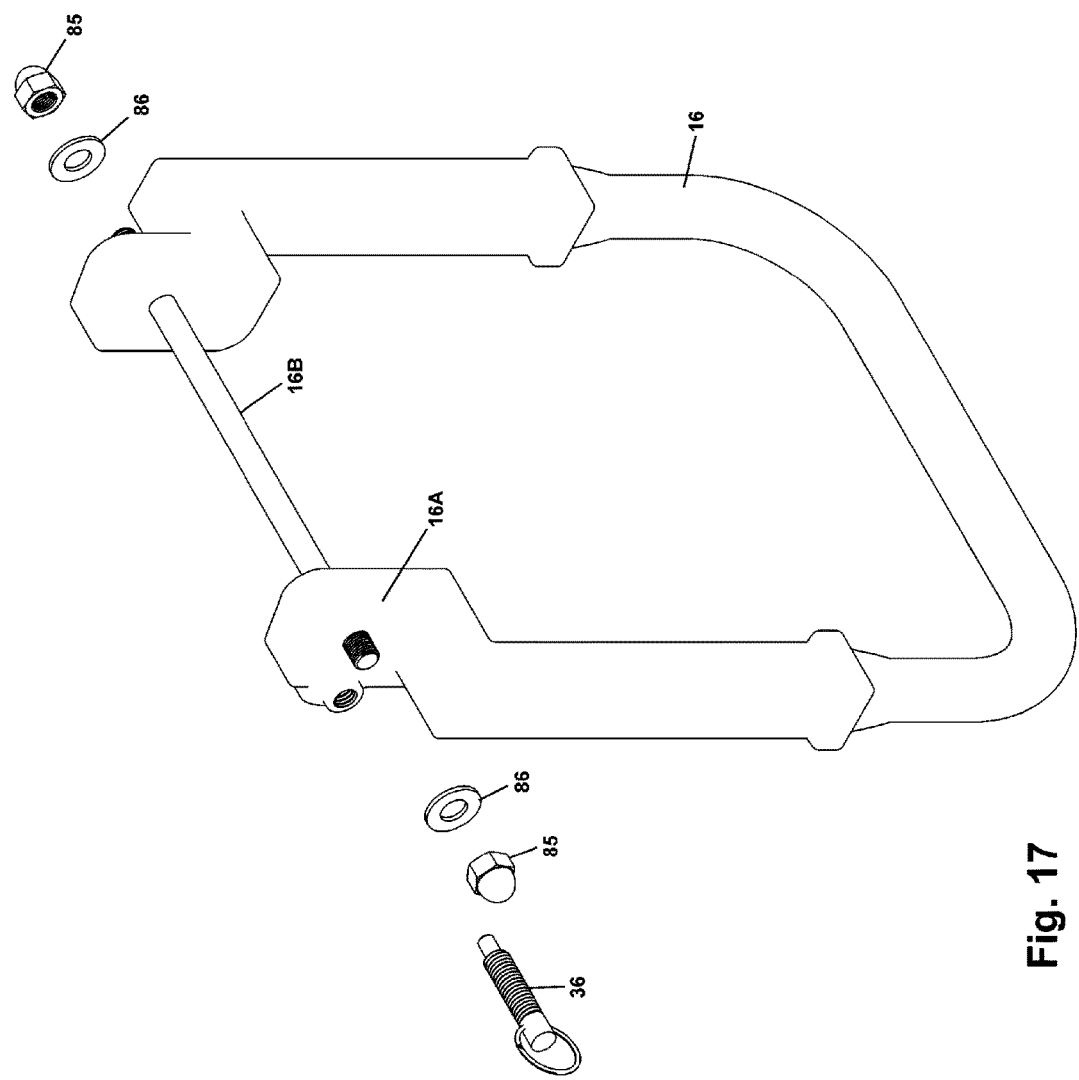
FIG. 17 is a perspective view showing details of a handle 16 of portable cooler 10.

Referring now to FIG. 14, a perspective view showing an exploded view of latch 26 and lock plate 60 of portable insulated cooler 10 is shown. Lock plate 60 is mounted to the end of base 12B with bolts 65 and covers shaped recess 62 formed in base 12B. Latch 26 includes tang 26A which is attached to latch 26 by a bolt 67. FIG. 15 shows an exploded view of a mounting of first portion of hinged mount 24 including pin 64 that is used to attach second portion of hinged mount 20 to portable insulated cooler 10. A shaped recess 70 includes cut-outs 72 that permit the ends of pin 64 to lie partially beneath the end surface of body 12B, so that when first portion of hinged mount 24, including pin 64 is secured to body 12B, a low-profile is maintained at the exterior surface of portable insulated cooler 10. FIG. 16 shows an exploded view of second portion of hinged mount 20 and wheels 25 of portable cooler 10. Bushings 28A are fit to axle 28 to provide low-friction rotation and so that hubs 25A of wheels may be of plastic design without excessive wear. Washers 80 and lock washers 81 provide for securing wheels 25 on axle 28, and caps 82 are provided to cover the ends of axle 28. FIG. 17 shows details of handle 16 of portable cooler 10, including a portion that provides a hinged connection to base 12B and mounting washers 86 and cap nuts 85 used to secure handle 16 to base 12B with a thread-ended rod 16B. Spring-loaded locking pin 36 is also shown.

Figure 18:
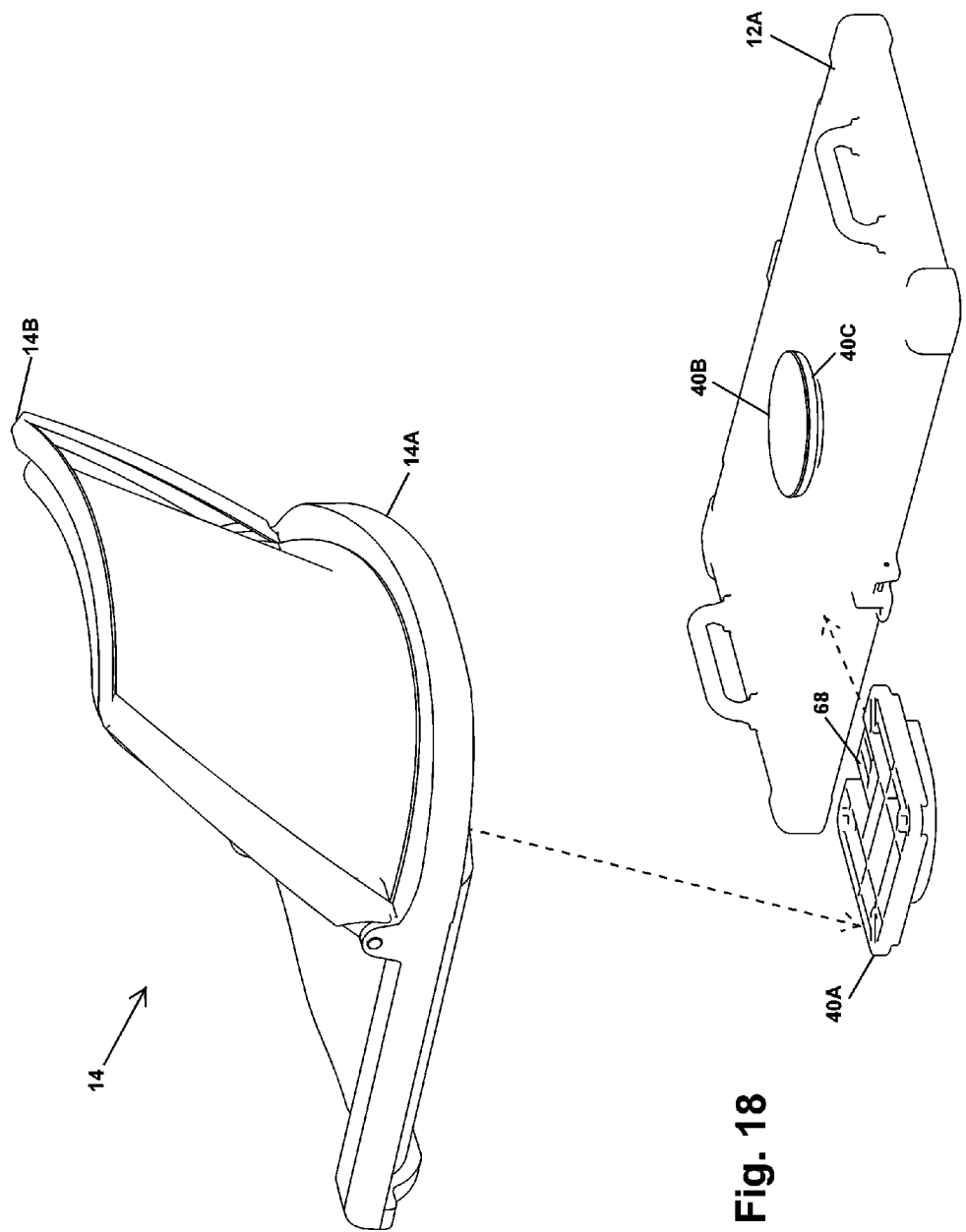
FIG. 18 is an assembly view showing a seat 14, top swivel portion 40A and a bottom swivel portion 40B of portable cooler 10.
Figure 19:
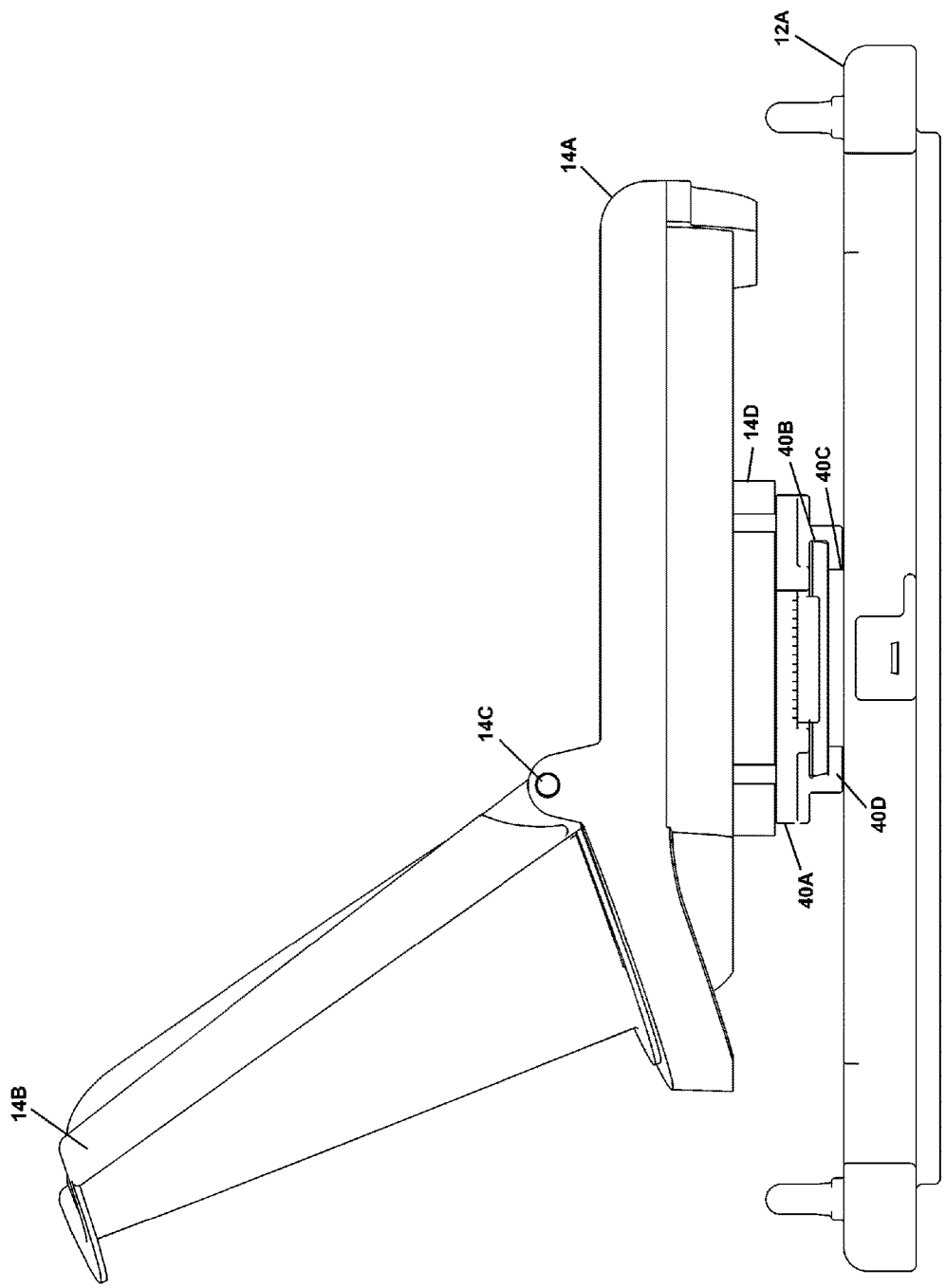
FIG. 19 is a perspective view showing details of a mounting arrangement for seat 14 to a top 12A of portable cooler 10.

Referring now to FIG. 18, an assembly view showing seat 14, top swivel portion 40A and bottom swivel portion 40B of portable cooler 10 is shown. Top swivel portion 40A is bolted to a mounting portion 14D molded onto the bottom of base 14A of seat 14 and is snapped onto bottom swivel portion 40B, which retains seat 14 atop top cover 12A due to undercut 40C snapping past the corresponding mating ring formed inside top swivel portion 40A. By lifting a lever 68, which is a molded part of top swivel portion 40A, top swivel portion 40A is released from bottom swivel portion 40B. FIG. 19 shows mating ring 40D of top swivel portion 40A secured within undercut 40C.

Figure 20:
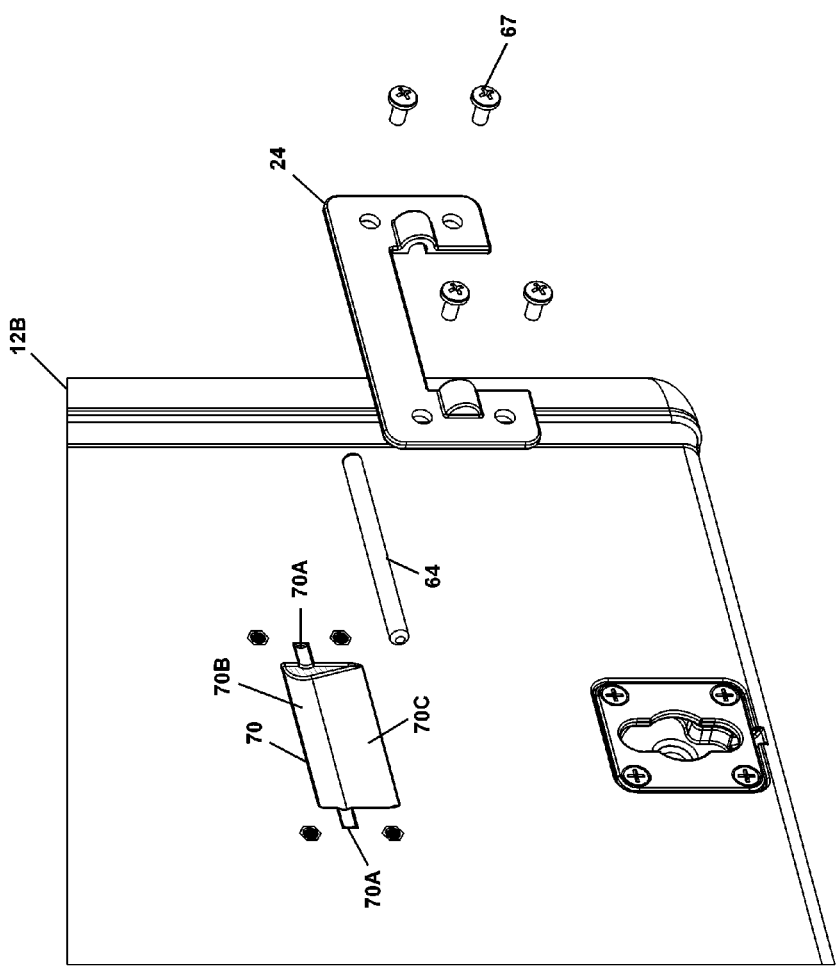
FIG. 20 is an exploded perspective view showing details of a mounting arrangement for pin 64 to the back end of portable cooler 10.
Figure 21:
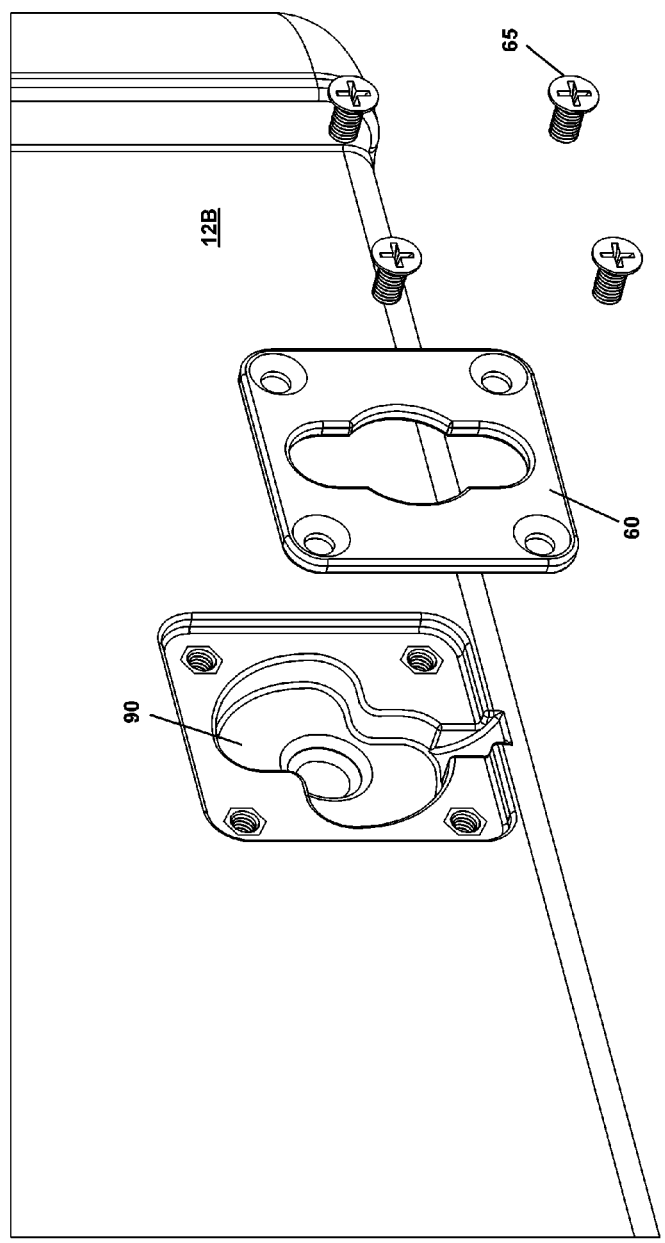
FIG. 21 is an exploded perspective view showing details of lock plate 60 and a shaped recess 80 at the back end portable cooler 10.

FIG. 20 shows details of a mounting arrangement of first portion of hinged mount 24, secured by bolts 67, so that the ends of pin 64 lie within cutouts 70A. FIG. 20 also illustrates how the inner wall of base 12B is shaped with a hemispherical upper portion 70B that aids in retaining hooked end 22 of second portion of hinged mount 20, but with a slanted straight wall in a lower portion 70C, to permit hooked end 22 to slide downward when the gap formed at the end of hooked end 22 is rotated to the release position as shown in FIGS. 11-13. FIG. 21 shows an exploded view of lock plate 60 and "butterfly-shaped" recess 90 at the back end of base 12B that restricts tang 26B to 90 degrees of rotation.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A portable cooler, comprising:
    an insulated cooler shell defining an inner void for placement of a cooling agent and objects to be cooled, the insulated cooler shell having a bottom, two ends and two sides, wherein a top of the insulated cooler shell provides access to the inner void;
    a cooler top for covering the top of the insulated cooler shell;
    a seat mounted to the cooler top, the seat having a base portion substantially parallel to the cooler top and a back support portion extending upward from the base portion;
    a pair of wheels located near a first end of the cooler and underneath the bottom of the cooler; and
    a hinged mount that couples the pair of wheels to the insulated cooler shell and mounted to the first end of the cooler such that the wheels are rotatable from a first position beneath the cooler for rolling the cooler to a second position extended away from the first end of the cooler so that the bottom of the cooler is locatable on a surface without obstruction by the pair of wheels and without removing the wheels and hinged mount from the portable cooler.

2. The portable cooler of claim 1, wherein the hinged mount has a separable hinge with a first hinge portion attached to the cooler and a second hinge portion formed at a first end of the hinged mount opposite a second end of the hinged mount at which at least one axle for mounting the pair of wheels is located.

3. The portable cooler of claim 2, wherein the second hinge portion is formed from a continuous material having a first extension that, when the wheels are secured under the bottom of the portable cooler, extends along the bottom of the portable cooler and terminates in at least one bushing for receiving the at least one axle and a second extension that, when the wheels are secured under the bottom of the portable cooler, extends upward along the first end of the cooler from the bottom of the cooler and terminates in a hook.

4. The portable cooler of claim 3, wherein the first hinge portion comprises a pin secured to the first end of the cooler and the hook has a partial circular cross-section defining a gap through which the hook is securable around the pin.

5. The portable cooler of claim 4, wherein the first end of the cooler in the vicinity of the cooler is shaped and the gap of the hook is positioned such that the hinged mount must be rotated to locate the second portion of the hinged mount substantially above a position parallel to the bottom of the cooler before the pin is insertable through the gap to detach the second hinge portion and the pair of wheels attached thereto from the cooler.

6. The portable cooler of claim 3, wherein the at least one bushing is a single bushing, wherein the at least one axle is a single axle that is mounted through the single bushing formed at an end of the first portion of the hinged mount.

7. The portable cooler of claim 3, further comprising a rotatable locking mechanism that secures the hinged mount in the first position and rotates to release the second hinge portion to extend away from the cooler in the second position, wherein the rotatable locking mechanism is secured to and extends through the second hinge portion to mate with a shaped recess provided on the first end of the portable cooler.

8. The portable cooler of claim 1, further comprising a rotatable locking mechanism that secures the hinged mount in the first position and rotates to release the hinged mount to extend away from the cooler in the second position.

9. The portable cooler of claim 1, wherein the base portion of the seat is mounted to a swivel, so that the seat is rotatable in a plane parallel to the top of the portable cooler, and wherein the swivel has an upper portion mounted to the seat and a lower portion mounted to cooler top, wherein the upper portion is releasable from the lower portion, enabling removal of the seat from the cooler top.

10. The portable cooler of claim 9, wherein the lower portion of the swivel is a plastic protrusion molded in the cooler top in the form of a circular disc having an undercut channel to which the upper portion of the swivel releasably attaches.

11. The portable cooler of claim 1, further comprising a rotating handle affixed to a second end of the portable cooler and having a locking mechanism that secures the rotating handle in a position substantially parallel to the top of the portable cooler for pulling the cooler and in a position alongside the second end of the portable cooler to stow the handle.

12. The portable cooler of claim 1, wherein the base portion of the seat and the back portion of the seat are rotatably connected, so that the back portion of the seat is downwardly foldable over the base portion of the seat to reduce the profile of the seat for carrying and storage.

13. The portable cooler of claim 1 further comprising a tray removably mounted to a first side of the portable cooler.

14. The portable cooler of claim 13, further comprising a cup holder removably mounted to a second side of the portable cooler.

15. The portable cooler of claim 14, wherein the cup holder defines a pair of apertures formed through a top thereof for accepting cups of corresponding different diameters, and further comprises a pair of mesh cylinders secured at bottoms of the apertures and extending downward toward a bottom of the cooler, whereby a profile of the cup holder is reduced during storage.

16. A portable cooler, comprising:
an insulated cooler shell defining an inner void for placement of a cooling agent and objects to be cooled, the insulated cooler shell having a bottom, two ends and two sides, wherein a top of the insulated cooler shell provides access to the inner void;
a cooler top for covering the top of the insulated cooler shell;
a seat mounted to the cooler top, the seat having a base portion substantially parallel to the cooler top and a back support portion extending upward from the base portion;
a pair of wheels located near a first end of the cooler and underneath the bottom of the cooler and mounted to an axle at respective ends thereof;
a hinged mount that couples the pair of wheels to the insulated cooler shell and mounted to the first end of the cooler such that the wheels are rotatable from a first position beneath the cooler for rolling the cooler to a second position extended away from the first end of the cooler so that the bottom of the cooler is locatable on a surface without obstruction by the pair of wheels and without removing the wheels and hinged mount from the portable cooler, wherein the hinged mount has a separable hinge with a first hinge portion attached to the cooler and a second hinge portion formed at a first end of the hinged mount opposite a bushing formed at a second end of the hinged mount through which the axle is inserted, wherein the hinged mount is formed from a continuous material having a first extension that, when the wheels are secured under the bottom of the portable cooler, extends along the bottom of the portable cooler, and a second extension that, when the wheels are secured under the bottom of the portable cooler, extends upward along the first end of the cooler from the bottom of the cooler and terminates in a hook, wherein the first hinge portion comprises a pin secured to the first end of the cooler and the hook has a partial circular cross-section defining a gap through which the hook is securable around the pin, and wherein the first end of the cooler in the vicinity of the cooler is shaped and the gap of the second hinge portion is positioned such that the hinged mount must be rotated to locate the second hinge portion substantially above a position parallel to the bottom of the cooler before the pin is insertable through the gap to detach the second hinge portion and the pair of wheels attached thereto from the cooler; and
a rotatable locking mechanism that secures the hinged mount in the first position and rotates to release the second hinge portion to extend away from the cooler in the second position, wherein the rotatable locking mechanism is secured to and extends through the second hinge portion to mate with a shaped recess provided on the first of end the portable cooler.

17. A method of providing seating and cold transport of food and beverages in a portable cooler, the method comprising:
providing an insulated cooler shell defining an inner void for placement of a cooling agent and objects to be cooled, the insulated cooler shell having a bottom, two ends and two sides, wherein a top of the insulated cooler shell provides access to the inner void;
covering the top of the insulated cooler shell with a cooler top;
mounting a seat to the cooler top for providing the seating, the seat having a base portion substantially parallel to the cooler top and a back support portion extending upward from the base portion;
moving the cooler using a pair of wheels located near a first end of the cooler and underneath the bottom of the portable cooler; and
couples the pair of wheels to the insulated cooler shell with a hinged mount affixed to the first end of the cooler; and
rotating the wheels from a first position beneath the cooler for performing the moving to a second position extended away from the first end of the cooler so that the bottom of the cooler is locatable on a surface without obstruction by the pair of wheels and without removing the wheels and hinged mount from the portable cooler.

18. The method of claim 17, wherein the hinged mount has a separable hinge with a first hinge portion attached to the cooler and a second hinge portion formed at a first end of the hinged mount opposite a second end of the hinged mount at which at least one axle for mounting the pair of wheels is located.

19. The method of claim 18, wherein the second hinge portion is formed from a continuous material having a first extension that, when the wheels are secured under the bottom of the portable cooler, extends along the bottom of the portable cooler and terminates in at least one bushing for receiving the at least one axle and a second extension that, when the wheels are secured under the bottom of the portable cooler, extends upward along the first end of the cooler from the bottom of the cooler and terminates in a hook.

20. The method of claim 17, wherein the first hinge portion comprises a pin secured to the first end of the cooler and the hook has a partial circular cross-section defining a gap, and wherein the method further comprises hooking the hook around the pin to secure the hinged mount to the cooler.

21. The method of claim 20, wherein the first end of the cooler in the vicinity of the cooler is shaped and the gap of the hook is positioned such that the second hinge portion must be rotated to locate the second hinge portion substantially above a position parallel to the bottom of the cooler before the pin is insertable through the gap to detach the second hinge portion and the pair of wheels attached thereto from the cooler.

22. The method of claim 20, wherein the at least one bushing is a single bushing, wherein the at least one axle is a single axle, and wherein the method further comprises mounting the single axle through the single bushing formed at an end of the second hinge portion.

23. The method of claim 20, further comprising:
securing the hinged mount in the first position with a rotatable locking mechanism that rotates; and
rotating the rotatable locking mechanism to release the second hinge portion to extend away from the cooler in the second position, wherein the rotatable locking mechanism is secured to and extends through the second portion of the second hinge portion to mate with a shaped recess provided on the first end of the portable cooler when the hinged mount is secured in the first position.

24. The method of claim 17, further comprising:
securing the hinged mount in the first position with a rotatable locking mechanism; and rotating the locking mechanism to release the hinged mount to extend away from the cooler in the second position.

25. The method of claim 17, further comprising:
mounting the base portion of the seat to a swivel, so that the seat is rotatable in a plane parallel to the top of the portable cooler, and wherein the swivel has an upper portion mounted to the seat and a lower portion mounted to cooler top; and
releasing the upper portion from the lower portion to remove the seat from the cooler top.

26. The method of claim 25, wherein the lower portion of the swivel is a plastic protrusion molded in the cooler top in the form of a circular disc having an undercut channel to which the upper portion of the swivel releasably attaches.

27. The method of claim 17, wherein the moving is performed by pulling a rotating handle affixed to a second end of the portable cooler that has a locking mechanism that secures the rotating handle in a position substantially parallel to the top of the portable cooler; and wherein the method comprises releasing the locking mechanism and rotating the handle to a position alongside the second end of the portable cooler to stow the handle.

28. The method of claim 17, wherein the base portion of the seat and the back portion of the seat are rotatably connected, and wherein the method further comprises folding down the back portion of the seat over the base portion to reduce the profile of the seat for carrying and storage.

29. The method of claim 17, further comprising removably mounting a tray to a first side of the portable cooler.

30. The method of claim 29, further comprising removably mounting a cup holder to a second side of the portable cooler.

31. The method of claim 30, wherein the cup holder defines a pair of apertures formed through a top thereof for accepting cups of corresponding different diameters, and wherein the method further comprises securing a pair of mesh cylinders at bottoms of the apertures and extending downward toward a bottom of the cooler, whereby a profile of the cup holder is reduced during storage.

* * * * *